Patented Oct. 16, 1928.

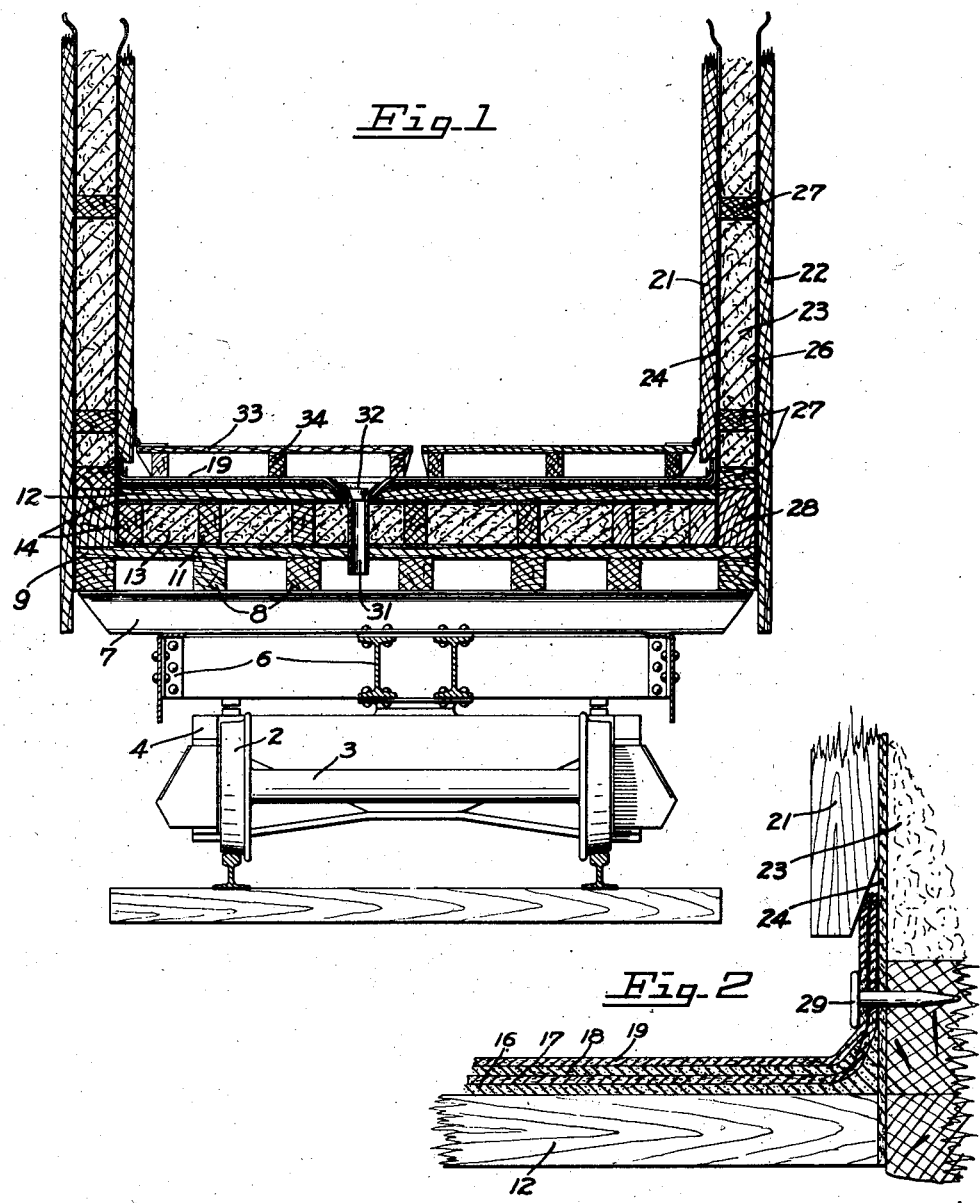

1,687,934

UNITED STATES PATENT OFFICE.

DOZIER FINLEY, OF BERKELEY, CALIFORNIA, ASSIGNOR TO THE PARAFFINE COMPANIES, INC., OF SAN FRANCISCO, CALIFORNIA, A CORPORATION OF DELAWARE.

REFRIGERATOR-CAR CONSTRUCTION.

Application filed May 17, 1926. Serial No. 109,541.

My invention relates to freight cars, and particularly to insulated freight cars used for transporting perishable products such as fresh fruits, vegetables, meats or the like.

One of the objects of my invention is to provide an insulated freight car having a water-proof floor which is not so liable to deterioration as those now in use, and which may be easily kept in a clean, sanitary, and serviceable condition.

Another object of my invention is the production of a car in which icing is not necessarily limited to the ice compartments at the end of the car, but in which icing may be conducted throughout the entire interior car space.

Another object of the invention is the provision of a car having a floor structure highly resistant to injury and deterioration under the abuse incident to the various ways of loading to which a car may be subjected.

A further object of the invention is the construction of an insulated freight car having a higher insulating value than those now in use, and this without an attendant increase in cost or without an attendant decrease in available carrying space.

My invention possesses other objects and features of advantage some of which with the foregoing will be set forth in the following description of the preferred form of my invention which is illustrated in the drawings accompanying and forming part of the specification. It is to be understood that I do not limit myself to the showing by said drawings and description, as I may adopt variations of the preferred form within the scope of my invention as set forth in the claims.

In the drawings:

Figure 1 is a sectional view thru a freight car constructed according to my invention; the upper portion of the car is broken away to reduce the size of the figure.

Figure 2 is a sectional view thru a portion of the car, and showing in enlarged detail the construction of the floor.

Insulated freight cars now in use are usually provided with a floor having a wearing surface of wood consisting of tongue and groove lumber about 1¾" thick, and which is given a soaking coat of paraffine. Below such wearing surface is usually a lower sheathing of wood and between which and the wearing surface is disposed a layer of insulation material such as cork, felt, matted sugar cane fiber, or the like. The paraffine coat being non-yielding, does not respond to the expansion and contraction of the floor boarding, and is easily broken by excessive car vibration, with the result that such floor structure soon ceases to be waterproof, and fails to prevent water from reaching the insulating material below, which of course greatly reduces its insulating value. Furthermore such a car structure easily accumulates dirt, offers little resistance to abrasion, and when in bad condition, is difficult and expensive to restore to its original condition. Applicant's invention, in addition to offering numerous advantages, obviates the foregoing defects.

Referring to the drawings, my invention comprises the usual freight car carriage comprising wheels 2 mounted on the axle 3 and fitted with the truck frames 4 upon which are mounted the sills 6. Cross sills 7 are mounted at spaced intervals upon the sills 6 and support a plurality of longitudinal floor beams 8, preferably of wood and upon which the weight of the car super-structure is distributed.

Secured to the beams 8 is the lower or outside wooden floor boarding or sheathing 9, and spaced therefrom by means of spacers 11, preferably of wood and which may conveniently extend the length of the car, is an upper floor boarding or sheathing 12. Both the upper and lower floor sheathings substantially cover the beams 8, and the number of floor spacers 11 may be varied or they may be entirely dispensed with according to the character of the insulation filling. Interposed between the lower and upper floor sheathings 9 and 12 is a filling 13 of insulating material which may consist of pressed cork blocks, loose cork, hair felt, matted sugar cane fiber, insulating blocks of the type commercially sold under the name of Celite, or any similar material. The filling is preferably protected above and below from moisture, by sheets of asphaltic paper 14 interposed between the filling and the sheathings 9 and 12.

Over the upper sheathing 12 I provide a covering which forms the floor surface and which not only constitutes means for preventing access of water to the insulating filling but which forms a very durable surface particularly constituted to stand the rough wear of truck wheels and freight cases. Cemented to the upper sheathing 12 by a quick drying asphaltic paint 16 is a sheet of fabric or felt 17 saturated with a semi-solid material preferably an asphaltic compound semi-solid at ordinary temperatures. To the sheet 17 is cemented, by a similar paint 18, a bitumen coated fibrous sheet 19 which is also saturated with some semi-solid material. This bitumen coating is on the upper and wearing surface of the floor, and coalesces more or less with the saturating compound.

The bounding edges of the sheets 17 and 19 are turned upwardly and are secured to the side walls of the car. The side walls comprise an inner sheathing 21 and an outer sheathing 22 between which is a filling of insulating material 23 which is protected by asphaltic sheets 24 and 26 as in the floor structure. A plurality of wooden beams 27 extending longitudinally of the sides and between the sheathings 24 and 26 constitute the car body framework. The outer side sheathing 22 extends below the flooring and is secured to the side bottom plate 28 by any suitable means, and the inner sheathing 21 which lies contiguous to the asphaltic sheet 24, extends down over the upturned edge of the bitumen coated sheet 19 and the upturned edge of the saturated sheet 17, both of which are preferably secured to the asphaltic sheet 24 and the lower beam 27 by nails 29. In this manner water is prevented from gaining access to the flooring by way of the car sides.

So as to keep the car dry at all times I provide a drain 31, having a stopper 32 and which extends thru the floor structure. This construction permits the carrying of ice in the car and also enables the car to be readily washed out.

It is frequently desirable to allow cold air to circulate below the car contents, I therefore provide a grating 33 spaced from the floor by cleats 34 and formed in sections which are preferably hinged to the inner side-sheathing 21. When not required, the grating may be placed in a vertical position alongside the sidewalls.

Because of the inherent resiliency of the floor covering, the strains and shocks received by the floor when the car is under way will not affect the waterproof feature of the floor, and it has been found that the durability of the floor far exceeds those now in use.

I claim:

1. In a car construction a floor comprising an upper and a lower sheathing, an insulated filling interposed between said upper and lower sheathing, a sheet saturated with semi-solid material and secured to said upper sheathing, and a bitumen coated fibrous sheet secured to said first mentioned sheet and forming the wearing surface of the floor.

2. In a car construction a floor comprising an upper and a lower sheathing, an insulated filling interposed between said upper and lower sheathing, a sheet saturated with semi-solid material and secured to said upper sheathing, a bitumen coated fibrous sheet secured to said first mentioned sheet and forming the wearing surface of the floor, and a drain extending thru said floor.

3. In a car construction, a side wall embodying an inner and an outer sheathing, an insulating filling interposed between said sheathings, a flooring abutting said side wall and comprising an upper and a lower sheathing having an insulating filling interposed therebetween, a sheet saturated with semi-solid material and cemented to said upper sheathing, a bitumen coated fibrous sheet cemented to said saturated sheet and having an upturned edge secured to said side wall, the lower end of said inner sheathing extending over said upturned edge.

4. In a car construction a side wall embodying an inner and an outer sheathing, an insulating filling interposed between said sheathings, a waterproof sheet interposed between said inner sheathing and said filling, a flooring abutting said side wall and comprising an upper and a lower sheathing having an insulating filling interposed therebetween, a sheet saturated with semi-solid material and cemented to said upper sheathing, a bitumen coated fibrous sheet cemented to said saturated sheet and having an upturned edge secured to said side wall and against said waterproof sheet, the lower end of said inner sheathing extending over the upturned edge of said bitumen coated fibrous sheet.

5. In a car construction a floor comprising an upper and a lower sheathing, an insulated filling interposed between said upper and lower sheathings, a sheet saturated with semi-solid material, a layer of cement securing said sheet to said upper sheathing, a bitumen coated fibrous sheet covering said saturated sheet and forming the wearing surface of the floor, and a layer of cement securing said bitumen coated sheet to said saturated sheet.

In testimony whereof, I have hereunto set my hand.

DOZIER FINLEY.